United States Patent
Fuhr et al.

(10) Patent No.: US 9,123,223 B1
(45) Date of Patent: Sep. 1, 2015

(54) VIDEO MONITORING SYSTEM USING AN ALARM SENSOR FOR AN EXIT FACILITATING ACCESS TO CAPTURED VIDEO

(75) Inventors: Jaclyn Fuhr, Minneapolis, MN (US); Lisa A. Hurst, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 1784 days.

(21) Appl. No.: 12/250,210

(22) Filed: Oct. 13, 2008

(51) Int. Cl.
*G08B 13/196* (2006.01)

(52) U.S. Cl.
CPC .... *G08B 13/19665* (2013.01); *G08B 13/19669* (2013.01); *G08B 13/19671* (2013.01)

(58) Field of Classification Search
CPC .................. G08B 13/19665; G08B 13/19669; G08B 13/19671
USPC ................. 348/153, 155, 142–143, 148, 169, 348/240.99, 333.04; 340/572.1, 572.3, 340/572.9; 709/224; 705/10; 382/100, 103, 382/118, 142, 162, 236; 713/186
See application file for complete search history.

(56) References Cited

U.S. PATENT DOCUMENTS

| | | | |
|---|---|---|---|
| 3,665,448 A | | 5/1972 | McGlinchey et al. |
| 3,812,287 A | * | 5/1974 | Lemelson ..................... 348/155 |
| 5,347,262 A | | 9/1994 | Thurmond et al. |
| 5,354,974 A | | 10/1994 | Eisenberg |
| 5,526,133 A | * | 6/1996 | Paff ............................... 386/314 |
| 5,623,249 A | * | 4/1997 | Camire ......................... 340/555 |
| 6,424,371 B1 | * | 7/2002 | Wen .............................. 348/153 |
| 6,550,671 B1 | | 4/2003 | Brown et al. |
| 7,010,501 B1 | | 3/2006 | Roslak et al. |
| 7,446,803 B2 | * | 11/2008 | Leow et al. ................. 348/231.5 |
| 7,684,623 B2 | * | 3/2010 | Shen et al. .................... 382/203 |
| 2002/0054211 A1 | * | 5/2002 | Edelson et al. ............... 348/169 |
| 2002/0135801 A1 | * | 9/2002 | Tessman et al. ............. 358/1.15 |
| 2002/0147982 A1 | * | 10/2002 | Naidoo et al. ................ 725/105 |
| 2002/0158762 A1 | * | 10/2002 | Nguyen et al. ............. 340/572.9 |
| 2003/0005464 A1 | * | 1/2003 | Gropper et al. ............... 725/115 |
| 2003/0025599 A1 | * | 2/2003 | Monroe ........................ 340/531 |
| 2003/0191766 A1 | * | 10/2003 | Elin ............................. 707/100 |
| 2003/0197612 A1 | * | 10/2003 | Tanaka et al. .............. 340/572.1 |
| 2004/0022516 A1 | * | 2/2004 | Yamashiro et al. ............. 386/13 |
| 2004/0100652 A1 | * | 5/2004 | Cooper ........................ 358/1.15 |
| 2004/0117638 A1 | * | 6/2004 | Monroe ........................ 713/186 |
| 2004/0161133 A1 | * | 8/2004 | Elazar et al. ................. 382/115 |

(Continued)

FOREIGN PATENT DOCUMENTS

JP          02239372 A   *   9/1990   .............. G06F 15/40

OTHER PUBLICATIONS

MICROPACK. "CCTV Visual Flame Detection Sytem." May 2007. Web. <www.micropackamericas.com/library/salesbrochure.pdf>.*

(Continued)

*Primary Examiner* — Imad Hussain
(74) *Attorney, Agent, or Firm* — Nixon & Vanderhye P.C.

(57) ABSTRACT

An embodiment of a video monitoring system has at least one video camera directed at a detection system for obtaining video of the detection system. The detection system has a light source. A controller is coupled to the at least one video camera. The controller is configured to determine that the light source illuminates from the video of the detection system obtained by the at least one video camera. The controller is further configured to indicate an alarm in response to determining that the light source illuminates.

14 Claims, 5 Drawing Sheets

(56) References Cited

U.S. PATENT DOCUMENTS

| | | | |
|---|---|---|---|
| 2005/0057650 A1* | 3/2005 | Kogane et al. | 348/143 |
| 2005/0200494 A1 | 9/2005 | Herrmann et al. | |
| 2006/0001537 A1* | 1/2006 | Blake et al. | 340/521 |
| 2006/0004581 A1 | 1/2006 | Claudatos et al. | |
| 2006/0004582 A1 | 1/2006 | Claudatos et al. | |
| 2006/0109341 A1 | 5/2006 | Evans | |
| 2006/0184553 A1* | 8/2006 | Liu et al. | 707/101 |
| 2007/0014428 A1* | 1/2007 | Kountchev et al. | 382/100 |
| 2007/0016598 A1* | 1/2007 | Tessman et al. | 707/100 |
| 2007/0050829 A1* | 3/2007 | Asami et al. | 725/105 |
| 2007/0058842 A1 | 3/2007 | Vallone et al. | |
| 2007/0061696 A1 | 3/2007 | Vallone et al. | |
| 2007/0182818 A1* | 8/2007 | Buehler | 348/143 |
| 2007/0282665 A1* | 12/2007 | Buehler et al. | 705/10 |
| 2007/0283004 A1* | 12/2007 | Buehler | 709/224 |
| 2008/0012716 A1 | 1/2008 | Saltzstein et al. | |
| 2008/0062413 A1* | 3/2008 | Ashdown et al. | 356/218 |
| 2008/0080764 A1* | 4/2008 | Kim et al. | 382/162 |
| 2009/0040302 A1* | 2/2009 | Thompson | 348/143 |
| 2010/0145899 A1* | 6/2010 | Buehler | 706/47 |
| 2010/0171619 A1* | 7/2010 | Hall | 340/572.3 |

OTHER PUBLICATIONS

"So Why Isn't Shrink Shrinking?" by Jumbi Edulbehram, Ph.D., contributing writer, http://www.securitymagazine.com posted: Jan. 1, 2006, printed Oct. 13, 2008 (pp. 1-7).

GeoVision news GeoVision to Boost Up Loss Prevention in Retail through EAS Integration http://www.geovision.com.tw/english . . . , pp. 1-3, Sep. 26, 2008.

GeoVision Video Management Solution—Retail Application for Large Shopping Malls and Chain-store Enterprises (5 pages), website at: http://www.geovision.com.tw/upload/en/RetailApplication_VideoMGTSolution.pdf.

\* cited by examiner

VIDEO MONITORING SYSTEM USING AN ALARM SENSOR FOR AN EXIT FACILITATING ACCESS TO CAPTURED VIDEO

FIELD

The present disclosure relates generally to video monitoring, and in particular, the present disclosure relates to a video monitoring system for an exit of a facility.

BACKGROUND

Electronic article surveillance (EAS) is a method for detecting theft from facilities, such as stores, libraries, etc. For example, articles, such as merchandise, books, etc., are tagged with tags, such as radio frequency identification (RFID) tags, that when activated can be detected by a detector typically located at an exit of a facility. Note that for some facilities, an exit can also serve as an entrance of the facility.

The tags are deactivated or removed when an article is purchased or checked out. However, when the detector detects an activated tag, an alarm, such as an audible alarm, e.g., a bell, buzzer, or the like, and/or a visible alarm, e.g., a light, is activated for notifying personnel of the facility of a possible theft.

In addition, some exits of some facilities are monitored with cameras that are directed at the exits. Some facilities have multiple exits with continuous video monitoring, at least during hours of operation of the facility, meaning that several hours of video are recorded at each exit each day. Therefore, in order to review video corresponding to certain events occurring at an exit, several hours of video might need to be reviewed in order to locate those events on video.

For the reasons stated above, and for other reasons stated below which will become apparent to those skilled in the art upon reading and understanding the present specification, there is a need in the art for alternative video monitoring of exits of facilities.

SUMMARY

One embodiment of the present invention provides a video monitoring system. The video monitoring system has at least one video camera directed at a detection system for obtaining video of the detection system. The detection system has a light source. A controller is coupled to the at least one video camera. The controller is configured to determine that the light source illuminates from the video of the detection system obtained by the at least one video camera. The controller is further configured to indicate an alarm in response to determining that the light source illuminates.

DETAILED DESCRIPTION

Figure 1:
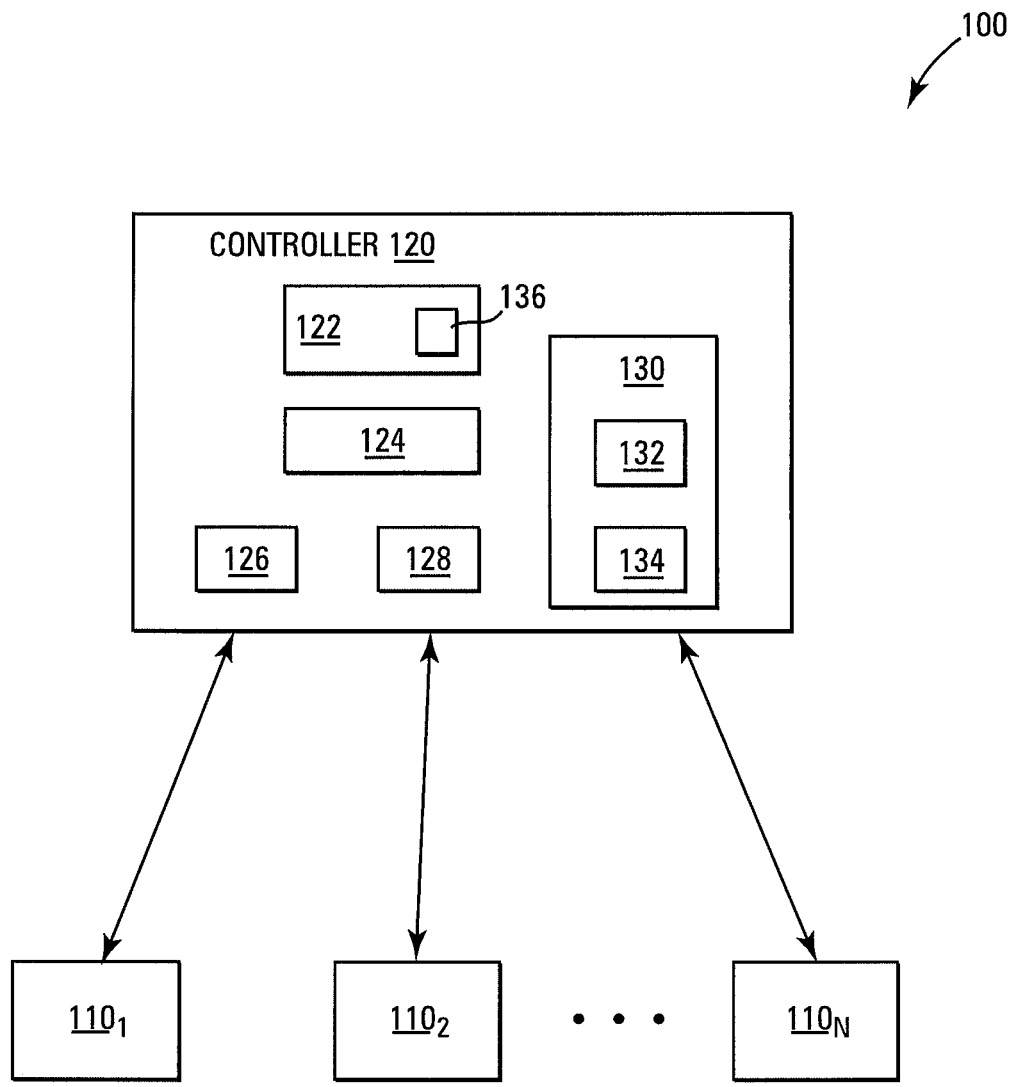
FIG. 1 is a block diagram of a video monitoring system, according to an embodiment of the present invention.

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. It is to be understood that other embodiments may be utilized and that process, electrical, and/or mechanical changes may be made without departing from the scope of the claimed subject matter. The following detailed description is, therefore, not to be taken in a limiting sense, and the scope of the present disclosure is defined only by the appended claims and equivalents thereof.

FIG. 1 is a block diagram of a video monitoring system 100, such as may be used for video surveillance, according to an embodiment. Video monitoring system 100 includes cameras $110_1$-$110_N$ coupled to a controller 120, such as a master video server. Monitoring devices, such as cameras 110, e.g., analog or digital video cameras, are respectively directed at exits of a facility, such as a retail store, library, etc. It will be appreciated that for some facilities, exits can also serve as entrances, so hereinafter "exit" will be used to denote exits of facilities having separate exits and entrances and to denote combined exits and entrances of facilities when the combined exits and entrances are being used as exits.

Controller 120 and cameras 110 may be coupled (e.g., electrically, wirelessly, etc.) to each other over a network, such as a local area network (LAN). For one embodiment, controller 120 may provide an interface for a user to interact with cameras 110. Controller 120 may be a computer, such as a personal computer, e.g., with a video display 122. Controller 120 may also include a keyboard 124 for inputting information into controller 120, and a pointing device (not shown), such as a "mouse," for controlling a cursor displayed on video display 122. For one embodiment, controller 120 may be configured to display video, such as analog or digital video, respectively received from cameras $110_1$ to $110_N$ in "windows" displayed on video display 122.

Controller 120 includes processor 126 for processing computer-readable instructions. These computer-readable instructions are stored in a memory 128, such as a computer-usable medium, and may be in the form of software, firmware, or hardware. The computer-readable instructions configure controller 120 to perform the operations and methods of the various embodiments of the present invention described below.

In a hardware solution, the computer-readable instructions are hard coded as part of processor 126, e.g., an application-specific integrated circuit (ASIC) chip. In a software or firmware solution, the instructions are stored for retrieval by the processor 126. Some additional examples of computer-usable media include static or dynamic random access memory (SRAM or DRAM), read-only memory (ROM), electrically erasable programmable ROM (EEPROM or flash memory), magnetic media and optical media, whether permanent or removable. Most consumer-oriented computer applications are software solutions provided to the user on some form of removable computer-usable media, such as a compact disc read-only memory (CD-ROM) or digital video disc (DVD). Controller 120 may include a storage device 130, such as a hard drive, removable flash memory, etc., for storing image data corresponding to video images captured by cameras $110_1$ to $110_N$.

Figure 2:
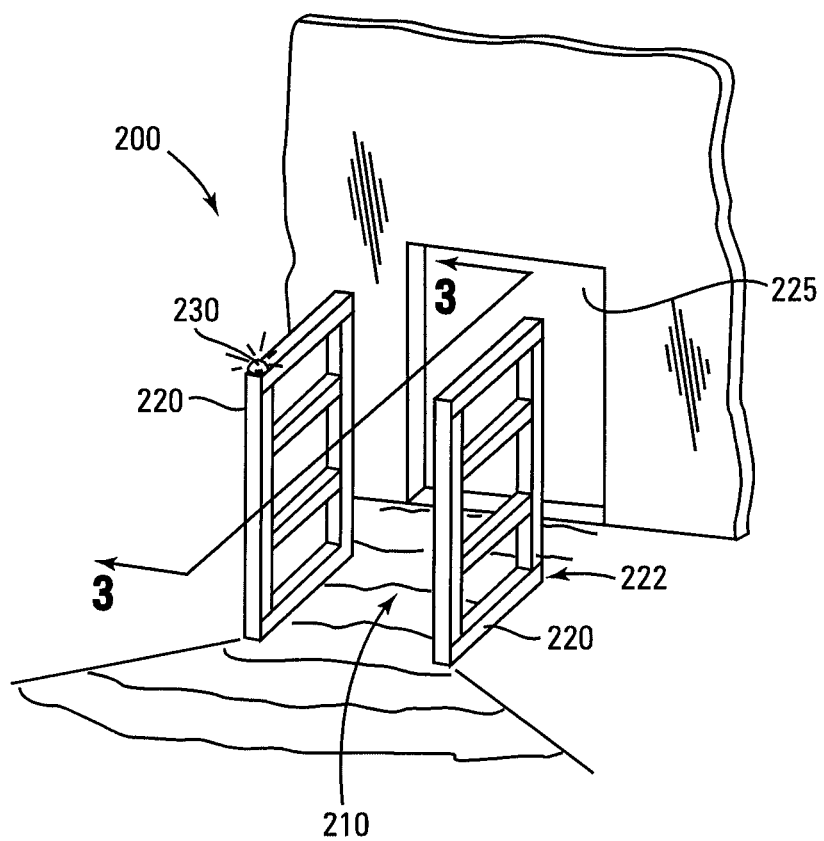
FIG. 2 is a pictorial view illustrating an exit area of a facility, according to another embodiment of the present invention.
Figure 3:
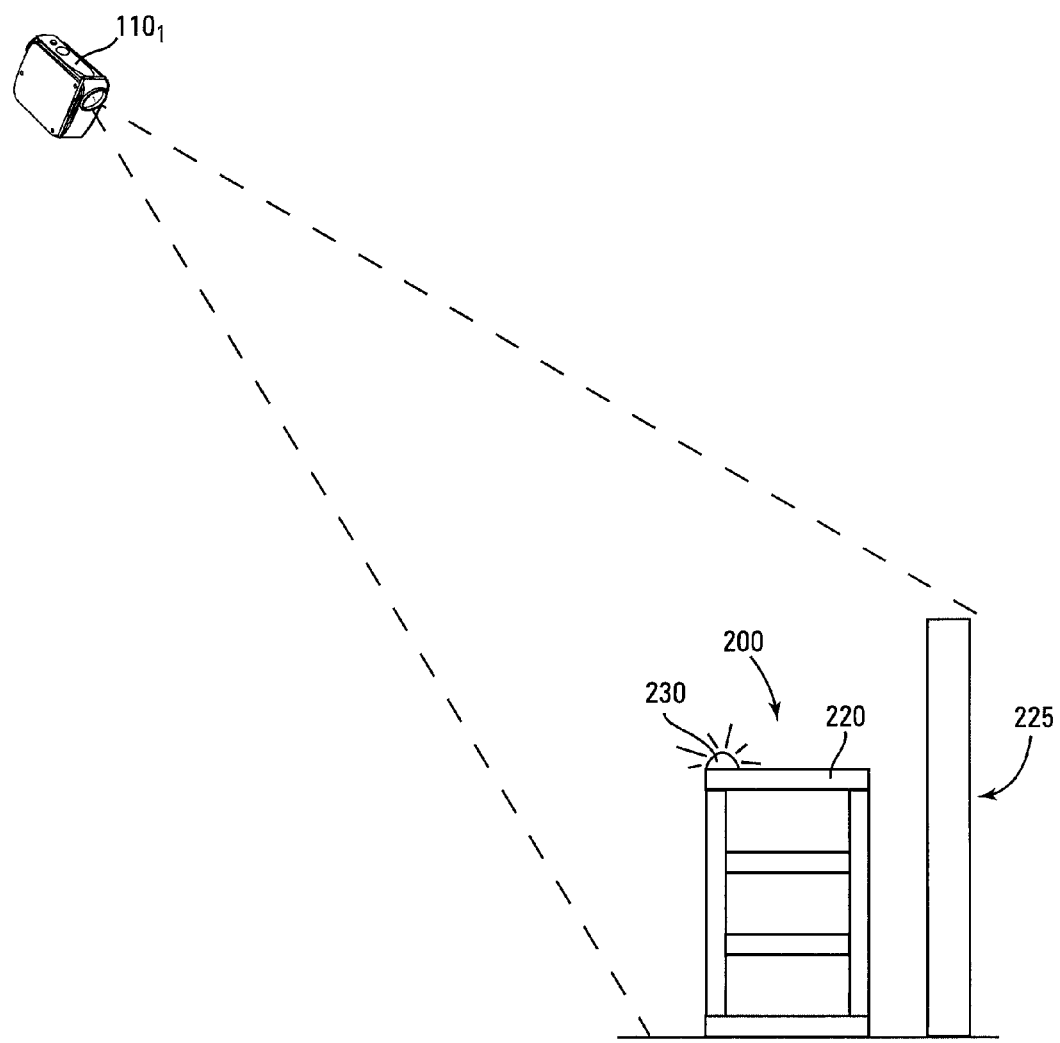
FIG. 3 is a view taken along line 3-3 of FIG. 2, illustrating video monitoring of the exit area of FIG. 2, according to another embodiment of the present invention.

FIG. 2 is a pictorial view illustrating an exit area 200 of the facility, according to one embodiment. Exit area 200 may include a detection zone 210 located between a pair of towers 220 of a detection system 222, such as a detection system of an electronic article surveillance (EAS) system, located in front of a doorway 225 that serves as an exit from the facility. At least one camera, e.g., camera $110_i$, of cameras $110_1$ to $110_N$ is directed at exit area 200, as shown in FIG. 3, a view taken along line 3-3 of FIG. 2.

A detection zone 210 and a detection system 222 may be located in front of at least one of an exit for guests of the facility and an exit specifically for employees of the facility. For example, there may be a detection zone 210 and a detection system 222 located in front of each of a plurality of exits of the facility. During operation, guests and/or employees pass through detection zone 210 between towers 220 before exiting the facility through doorway 225. Note that a portion of detection zone 210 may also be located outside of the region between towers 220. Note further that doorway 225 may also serve as an entrance to the facility in which case guests and/or employees pass through detection zone 210 between towers 220 after entering the facility through doorway 225.

Detection system 222 can detect an activated (e.g., an excited) tag affixed to an article, such as an article of merchandise, a book, etc., that moves past detection system 222, e.g., by moving through detection zone 210 between towers 220 or by moving around towers 220 without going between towers 220. At least one of towers 220 may include a transponder (e.g., sometimes called a reader or an interrogator) for detecting an activated tag, e.g., by detecting a signal from the tag. For example, when an article with an activated tag passes through detection zone 210 between towers 220 or around towers of detection system 222, the transponder in detection system 222 detects the signal from the activated tag and activates an alarm in response to detecting that signal. The alarm causes a light source (or light) 230 to illuminate, as shown in FIGS. 2 and 3. The alarm may also include an audible alarm, such as the sounding of a buzzer, horn, bell, etc.

The tag affixed to an article can be an electronic-article-surveillance (EAS) tag, such as a radio frequency identification (RFID) tag; detection system 222 is an EAS system, such as an RFID system; and the alarm is an EAS alarm. It should be understood that an RFID tag may include an integrated circuit attached to an antenna. During operation, the transponder of detection system 222 may send a signal to the antenna that provides enough power to cause the RFID tag to power-up. Once the RFID tag is powered up, the tag outputs a signal via the antenna to the transponder of detection system 222, causing the transponder of detection system 222 to activate the alarm in response to detecting the signal.

Figure 4:
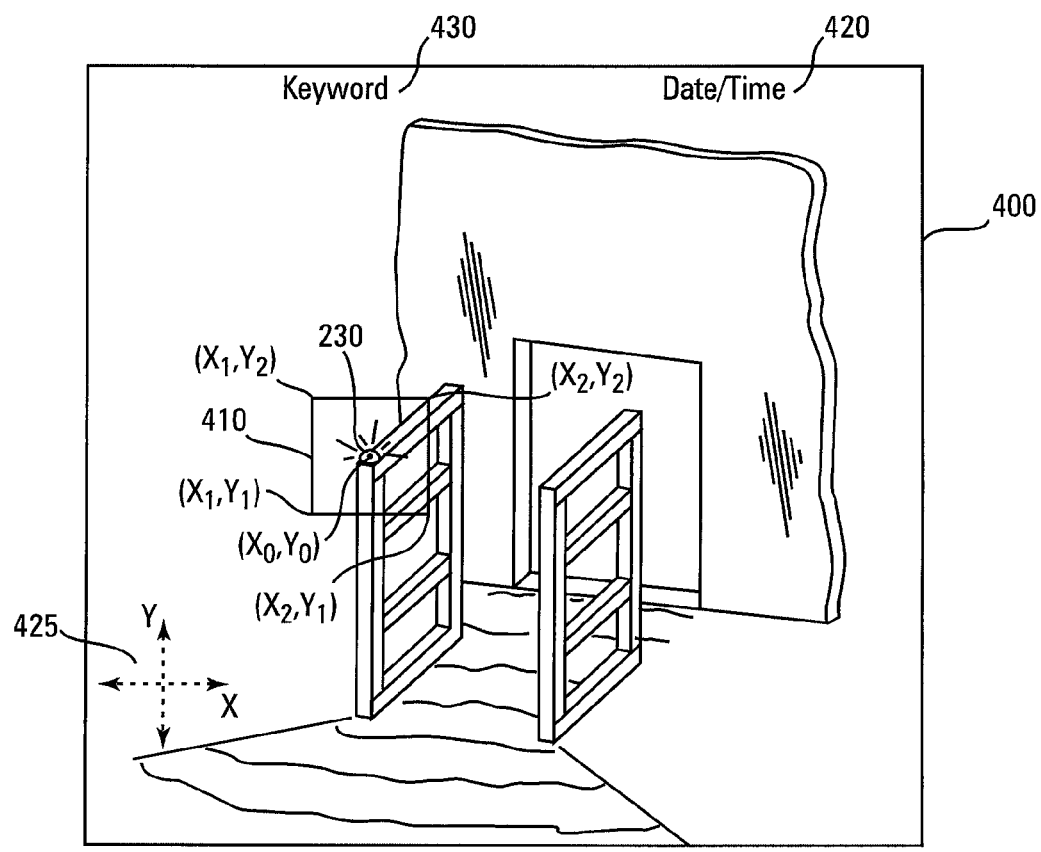
FIG. 4 illustrates an image field captured by a camera of the video monitoring system of FIG. 1, according to another embodiment of the present invention.

Controller 120 receives image data, corresponding to the images captured by each of cameras to $110_1$ to $110_N$. Controller 120 also receives image data corresponding to an image field 400 captured by camera $110_i$ that contains the image of exit area 200, including detection system 222, of FIGS. 2 and 3, as shown in FIG. 4. Note that the image data contained in image field 400 is contained in video captured by camera $110_i$. Controller 120 is configured to store the image data from each of cameras $110_1$ to $110_N$ in a database 132, e.g., in storage device 130.

For one embodiment, controller 120 is configured to determine that light source 230 illuminates by determining that the image of light source 230 within image field 400 illuminates. For example, controller 120 may determine that light source 230 illuminates by determining that the brightness of a portion of the video recorded by camera 110, that contains an image of light source 230 changes by at least a certain amount. That is, controller 120 may determine that light source 230 illuminates by determining that a brightness of a portion of image field 400 that contains light source 230 changes by at least the certain amount. For example, controller 120 may be configured to determine that the brightness of the pixels of the portion of image field 400 that contains light source 230 changes by at least the certain amount.

Controller 120 may be configured to average the brightness over the pixels of the portion of image field 400 that contains light source 230 to determine a numerical value indicative of the average brightness. Controller 120 may be further configured to determine a difference between numerical values indicative of the average brightness at two different times to determine whether the difference between those numerical values is greater than or equal to the certain amount. Controller 120 may then determine that light source 230 illuminates when the difference between those numerical values is greater than or equal to the certain amount.

The certain amount may be determined empirically by obtaining a first numerical value indicative of the average brightness when light source 230 is not illuminated (e.g., OFF) and a second numerical value indicative of the average brightness when light source 230 is illuminated (e.g., ON), and then taking the certain value to be the numerical difference between the first and second numerical values. The first numerical value may correspond to an average voltage that is directly proportional to the average brightness of the pixels when light source 230 is OFF, and the second numerical value may correspond to an average voltage that is directly proportional to the average brightness of the pixels when light source 230 is ON.

For example, each camera 110 may include an array of radiation (e.g., light) sensing elements, e.g., charged coupled device (CCD) radiation sensing elements, that correspond on a one-to-one basis to the pixels of the image field 400 of that camera 110. Each of the light sensing elements outputs an analog voltage in response to receiving light thereat that is directly proportional to the intensity (e.g., brightness) of the light, i.e., the voltage increases as the intensity increases. The analog voltages may be digitized using an analog to digital converter to create digital voltages. Controller 120 receives either the analog or digital voltages from the camera 110 corresponding to the pixels of image field 400. Controller 120 averages the received voltages produced by the sensors corresponding to the pixels containing light source 230 when light source 230 is OFF to obtain the first numerical value and averages the received voltages produced by those sensors when light source 230 is ON to obtain the second numerical value.

The location of light source 230 within image field 400 may be identified by the point $(x=x_o, y=y_0)$, e.g., nominally located at the center of light source 230, where x and y are defined by a Cartesian coordinate system 425. Coordinate system 425 is shown in FIG. 4 using dashed lines to indicate that coordinate system 425 is normally not visible. The location of the point $(x=x_o, y=y_0)$ may be predetermined and stored in storage device 130 of controller 120 for retrieval in response to controller 120 determining that light source 230 is illuminated. For one embodiment, controller 120 may be configured to monitor the pixels corresponding to light source 230 and containing the point $(x=x_o, y=y_0)$ for changes in the brightness of the pixels corresponding to light source 230.

Alternatively, the location of the point $(x=x_o, y=y_0)$ may be determined in response to controller 120 determining that light source 230 is illuminated. That is, controller may be configured to take the location of the point $(x=x_o, y=y_0)$ to be the center of the pixels whose brightness has changed by the certain amount as the result of light source 230 illuminating.

Controller 120 may be further configured to form a geometrical object 410, such as a circle, square, ellipse, etc., around light source 230 in response to determining that light source 230 is illuminated. That is, controller 120 may form geometrical object 410 around the point $(x=x_o, y=y_0)$ such that the point $(x=x_o, y=y_0)$ forms the center of geometrical object 410. Geometrical object 410 may be formed by highlighting portions, e.g., pixels, of image field 400 that coincide with geometrical object 410. That is, controller 120 may cause these pixels to contrast with regions within and around geometrical object 410. For example, controller 120 may set the pixels to a certain color that produces the contrast.

Controller 120 may determine the locations of the pixels within image field 400 that coincide with geometrical object 410 using an equation or set of equations for geometrical object 410, such as for a circle, square, ellipse, etc. For the example in FIG. 4, where geometrical object 410 is square, the locations of the pixels are determined from the following set of equations: $y=y_1$ and $y_2$ for $x_1 \leq x \leq x_2$ and $x=x_1$ and $x_2$ for $y_1 \leq y \leq y_2$.

Data corresponding to geometrical object 410 is stored in image data files containing images of exit area 200 and detection system 222. Data corresponding to a date/time indicator 420 may also be stored in those image data files. For example, data corresponding to date/time indicator 420 may be contained in a signal from a clock that is added to the image data, as is known to those having skill in the art.

Controller 120 is configured to indicate an alarm, such as an EAS alarm, in response to determining that light source 230 illuminates. For example, the EAS alarm may be part of a video analytic that is implemented in response to determining that light source 230 illuminates. For one embodiment, the video analytic may be implemented, and thus the EAS alarm may be indicated, in response to forming geometrical object 410 around the image of light source 230. Controller 120 may also be configured to indicate, as part of implementing the video analytic, a location in the database where video of exit area 200 and detection system 222 corresponding to the alarm is stored. Note that the video corresponding to the alarm may start at a time that light source 230 illuminates or at a time just prior to the time that light source 230 illuminates. Indicating the location of the video may be part of the alarm. For example, controller 120 may be configured to tag (e.g., "bookmark") the location in the database in response to determining that light source 230 has illuminated as part of the video analytic. Alternatively, tagging the location in the database may occur in response to forming geometrical object around the image of light source 230.

Controller 120 may be further configured to add an identifier to image data corresponding to the video taken of exit area 200 and detection system 222 as part of the video analytic in response to determining that light source 230 illuminates or in response to forming geometrical object 410. The identifier can be added to a signal containing the day and time or a similar signal and written into image data corresponding to a video frame corresponding to the time that light source 230 illuminated or a time just prior to the time that light source 230 illuminated. Note that the video to which the identifier is added corresponds to the alarm indicated by controller 120 in response to determining that light source 230 illuminates.

An identifier may be a randomly generated term, such as a keyword 430 (FIG. 4). That is, controller 120 may be configured to generate the term and to write the term into the image data file. In addition, controller 120 may be configured to include the term as part of the alarm as part of implementing the video analytic. The user can input the term into a global search of the database 132 that contains video recorded by cameras $110_1$ to $110_N$ to locate the image data containing the term. That is, controller 120 may be configured to search the database 132 for the image data corresponding to an alarm in response to the user inputting the term into a search engine of controller 120. For example, when a user entered term matches a term in the image data that image data is located. Controller 120 may be further configured to indicate, e.g., on display 122, each alarm and the location, in the database 132, of the image data corresponding to that alarm. Note that image data corresponding to an alarm is image data corresponding to video corresponding to that alarm, where video corresponding to an alarm is defined above.

Controller 120 may be configured to store one or more identifiers in a certain data file, such as an alarm log 134, in storage device 130 as part of the video analytic in response to determining that light source 230 illuminates or in response to forming geometric object 410. For example, an identifier of each alarm may be stored in the alarm log 134. The identifier of an alarm can be the name of the location of the alarm, e.g., the name of the exit where the alarm occurred. The identifier of an alarm can also include the day and time of the alarm and the type of alarm, e.g., an EAS alarm. Controller 120 may be configured to search for stored video corresponding to a particular camera 410 by the date and time that video was taken in response to a user inputting the date and time, e.g., into a search engine of controller 120.

The alarm log 134 may be contained in a "folder" 136 displayed on video display 122. The alarm log 134 may also contain the randomly generated term for use by the user in a search of the database.

An identifier (e.g., a randomly generated term, a date and time, etc.) may be stored in alarm log 134 in the form of hypertext so that the user can retrieve the video corresponding to that alarm by selecting the identifier, e.g., by pointing and "clicking." An example of such an identifier is a "bookmark" of the location.

Controller 120 may also be configured to create an image data file specifically for storing video of exit area 200 and detection system 222 corresponding to an alarm as part of implementing the video analytic, in response to determining that light source 230 illuminates or in response to forming geometrical object 410. Controller 120 may be further configured to indicate the name of the image data file as part of implementing the video analytic, e.g., by including the name of the image data file in the alarm log 134. The user may then input the name of the image data file in a search of the database of controller 120 to locate that image data file. Alternatively, the name of the image data file may be in the form of hypertext so that the image data file can be retrieved by selecting the name of the image data file, e.g., by pointing and "clicking."

Figure 5:
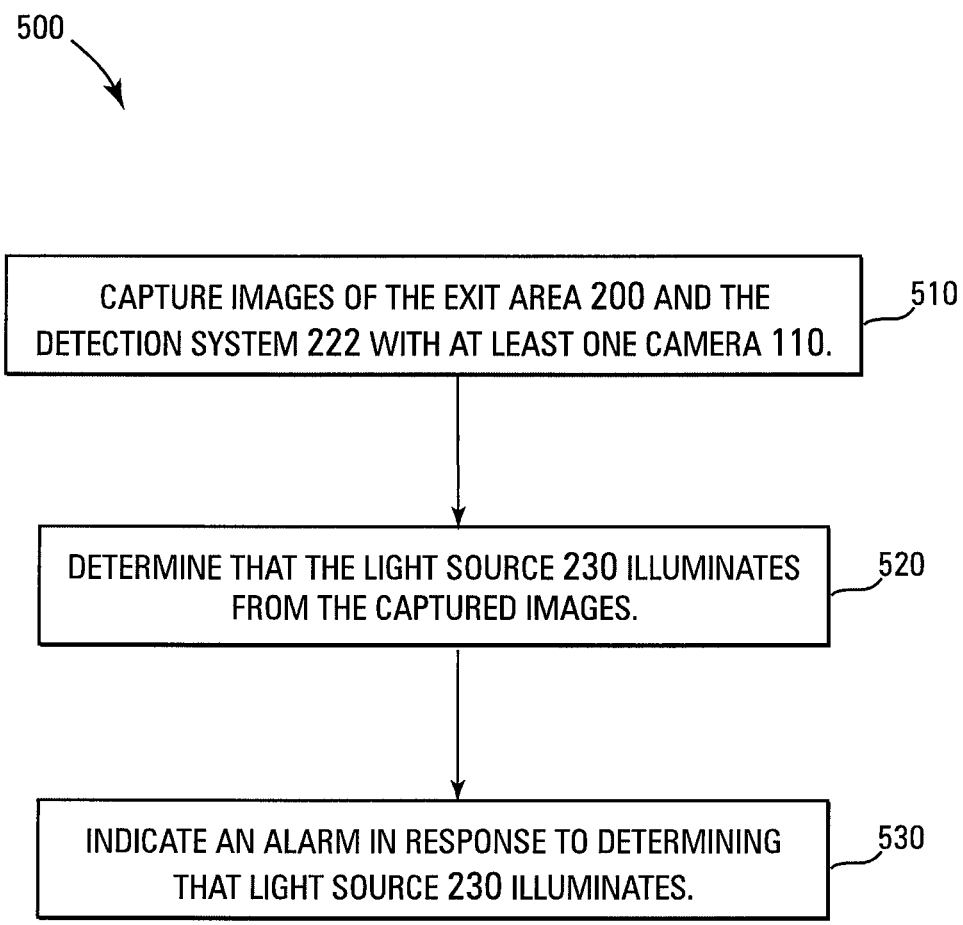
FIG. 5 is a flowchart of a method, according to another embodiment of the present invention.

FIG. 5 is a flowchart of a method 500 of monitoring exit area 200, according to another embodiment. At block 510, images of the exit area 200 and the detection system 222 are captured with at least one camera 110. At block 520, it is determined that light source 230 of detection system 222 illuminates from the captured images of the exit area 200 and the detection system 222. For example, illumination of light source 230 can be determined by determining that a brightness of the portion of image field 400 corresponding to the image of light source 230 changes by at least the certain amount, as described above. At block 530, an alarm is indicated in response to determining that light source 230 illuminates. The alarm may be stored in alarm log 134 in response to determining that light source 230 illuminates. A location, within the database 132, of captured images of the exit area and the detection system corresponding to the alarm may also be stored in alarm log 134 in response to determining that light source 230 illuminates. Note that images of the exit area and the detection system corresponding to an alarm are images of the exit area and the detection system that are obtained starting at a time that light source 230 illuminates or at a time just prior to the time that light source 230 illuminates.

Videos of an exit recorded during an exit alarm, such as an EAS alarm, can provide details of events that transpired during that alarm. For example, the recorded video can be used to judge actions of guests whose articles triggered the alarm, to judge actions of personnel in response to the alarm, to determine the validity of the alarm, etc. Further, the video can be used for improving responses to the alarm, reducing the number of invalid (e.g., false) alarms, etc. Using a video monitoring system, such as video monitoring system 100, to determine whether an alarm, such as an EAS alarm, occurs by determining that an EAS alarm light at an exit illuminates and to indicate where the video corresponding to that EAS alarm is stored can reduce the amount of video that needs to be reviewed in order to find the video corresponding to an EAS alarm.

CONCLUSION

Although specific embodiments have been illustrated and described herein it is manifestly intended that the scope of the claimed subject matter be limited only by the following claims and equivalents thereof.

What is claimed is:

1. A video monitoring system, comprising:
   at least one video camera directed at a detection system for obtaining video of the detection system, the detection system having a light source; and
   a controller coupled to the at least one video camera;
   wherein the controller is configured to determine that the light source illuminates from the video of the detection system obtained by the at least one video camera,
   the controller indicating an alarm in response to determining that the light source illuminates and storing a location where video of the detection system corresponding to the alarm is stored, wherein the controller stores the location by randomly generating a term and writing that term to video of the detection system corresponding to the alarm such that the term is displayed with the video and such that a user can input the term to locate the location where the video is stored, and wherein the controller additionally stores the term in an alarm log such that the user can search the alarm log to locate the video.

2. The video monitoring system of claim 1, wherein the controller stores the location by writing an identifier to video of the detection system corresponding to the alarm.

3. The video monitoring system of claim 2, wherein the controller is further configured to indicate the identifier when indicating the alarm.

4. The video monitoring system of claim 1, wherein the video of the detection system contains an image of the light source, and wherein the controller is further configured to form a geometrical object around the image of the light source after the light source illuminates in response to determining that the light source illuminates.

5. The video monitoring system of claim 4, wherein the controller is further configured to indicate the alarm in response to the controller forming the geometrical object around the image of the light source.

6. The video monitoring system of claim 1, further comprising a data file in which the controller stores the location.

7. The video monitoring system of claim 1, wherein the video of the detection system contains an image of the light source, and wherein the controller is further configured to determine that the image of the light source changes brightness in order to determine that the light source illuminates.

8. The video monitoring system of claim 1, wherein the detection system is an electronic article surveillance system.

9. A method of monitoring an exit area of a facility, the exit area containing a detection system having a light, the method comprising:
   capturing images of the exit area and the detection system with at least one camera;
   determining that the light illuminates from the captured images by averaging a brightness over pixels of the captured images that contain the light to determine an average brightness, and by determining a difference between numerical values indicative of the average brightness at two different times to determine whether the difference is at least equal to a certain amount;
   indicating an alarm in response to determining that the light illuminates;
   storing a location where the images of the exit area when the alarm is indicated are stored by writing an identifier to image data corresponding to captured images of the exit area and the detection system corresponding to the alarm; and
   storing the identifier of the location of the captured images of the exit area and the detection system corresponding to the alarm and/or an identifier of the alarm in an alarm log, wherein the alarm log is searchable based on the identifier.

10. The method of claim 9, wherein the captured images contain an image of the light, and further comprising forming a geometrical object around the image of the light within the captured images after the light illuminates in response to determining that the light illuminates.

11. The method of claim 9, further comprising indicating the identifier when indicating the alarm.

12. The method of claim 11, further comprising retrieving captured images of the exit area and the detection system corresponding to the alarm in response to a user selecting the identifier.

13. The method of claim 9, wherein determining that the light of the detection system illuminates comprises determining that a brightness of a portion of the captured images corresponding to an image of the light changes by at least a certain amount.

14. The method of claim 9, wherein the light illuminates at least in response to the detection system detecting an activated tag that moves past the detection system.

* * * * *